(12) United States Patent
Alexander et al.

(10) Patent No.: US 12,726,855 B2
(45) Date of Patent: Sep. 1, 2026

(54) MULTI-LINK OPERATION TRANSMIT ARCHITECTURE FOR DYNAMIC MAPPING OF TRANSMIT QUEUES TO LINKS

(71) Applicant: Intel Corporation, Santa Clara, CA (US)

(72) Inventors: Danny Alexander, Neve Efraim Monoson (IS); Ronen Levi, Kiryat Ata (IL); Oded Liron, Givat-Ada HA (IL); Nadav Szanto, Haifa (IL); Nevo Idan, Zichron Ya'akov HA (IL); Chen Kojokaro, Yoqneam Illit HA (IL); Nir Balaban, Kfar Netter (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/956,950

(22) Filed: Sep. 30, 2022

(65) Prior Publication Data

US 2024/0114394 A1 Apr. 4, 2024

(51) Int. Cl.
*H04W 28/10* (2009.01)
*H04L 47/62* (2022.01)

(52) U.S. Cl.
CPC ............. *H04W 28/10* (2013.01); *H04L 47/62* (2013.01)

(58) Field of Classification Search
CPC ................................ H04W 28/10; H04L 47/62
USPC .......................................................... 370/235
See application file for complete search history.

(56) References Cited

U.S. PATENT DOCUMENTS 12,047,873 B2 * 7/2024 Naik ................. H04W 74/0816
12,075,468 B2 * 8/2024 Jauh ...................... H04W 76/15
12,219,555 B2 * 2/2025 Xia ....................... H04W 74/06
12,278,773 B2 * 4/2025 Yang ................... H04W 28/082
12,309,792 B2 * 5/2025 Asterjadhi ............ H04W 76/15
12,309,861 B2 * 5/2025 Chitrakar .......... H04W 74/0816
12,317,189 B2 * 5/2025 Kim ...................... H04W 76/15
12,336,032 B2 * 6/2025 Kim ...................... H04W 76/15
12,336,034 B2 * 6/2025 Liu ................... H04W 28/0252
12,342,392 B2 * 6/2025 Xin .................. H04W 74/0866
12,356,345 B2 * 7/2025 Hirata ............... H04W 72/0446
12,375,210 B2 * 7/2025 Guo ........................ H04L 69/14
12,376,148 B2 * 7/2025 Lu ....................... H04W 74/006
12,389,436 B2 * 8/2025 Ikeda .................... H04W 72/54
12,414,156 B2 * 9/2025 Xin .................. H04W 74/0816
12,426,086 B2 * 9/2025 Homchaudhuri ....... H04L 69/14
12,439,454 B2 * 10/2025 Xin ..................... H04W 74/085
12,445,261 B2 * 10/2025 Ajami ................... H04W 72/12
12,446,072 B2 * 10/2025 Wang ............... H04W 74/0816
12,446,086 B2 * 10/2025 Ajami ................... H04W 76/12
12,446,087 B2 * 10/2025 Tomeba ................ H04W 76/15
(Continued)

FOREIGN PATENT DOCUMENTS

EP 4353017 B1 * 8/2025 ......... H04L 61/5038

*Primary Examiner* — Melvin H Pollack
(74) *Attorney, Agent, or Firm* — Schwegman Lundberg & Woessner, P.A.

(57) ABSTRACT

A multi-link device (MLD) apparatus, including at least two transmission queues and first medium access control (MAC) circuitry and second MAC circuitry. The first MAC circuitry and the second MAC circuitry can transmit data of the at least two transmission queues over respective links responsive to receiving a trigger indicating that a transmission opportunity (TXOP) is available on the link corresponding to the respective first MAC circuitry and second MAC circuitry.

22 Claims, 8 Drawing Sheets

(56) References Cited

U.S. PATENT DOCUMENTS

| | | | | |
|---|---|---|---|---|
| 12,446,089 | B2 * | 10/2025 | Kishida | H04W 52/0261 |
| 12,457,643 | B2 * | 10/2025 | Wang | H04L 5/0094 |
| 12,464,350 | B2 * | 11/2025 | Kim | H04W 76/15 |
| 12,464,439 | B2 * | 11/2025 | Kishida | H04W 28/0992 |
| 12,464,563 | B2 * | 11/2025 | Cherian | H04W 74/006 |
| 12,464,581 | B2 * | 11/2025 | Jang | H04L 69/14 |
| 12,464,583 | B2 * | 11/2025 | Lu | H04W 76/15 |
| 12,471,137 | B2 * | 11/2025 | Hwang | H04W 74/0808 |
| 12,471,142 | B2 * | 11/2025 | Lu | H04W 74/0816 |
| 2017/0311204 | A1 * | 10/2017 | Cariou | H04W 28/085 |
| 2018/0092107 | A1 * | 3/2018 | Cariou | H04W 72/23 |
| 2020/0137626 | A1 * | 4/2020 | Huang | H04L 1/1819 |
| 2024/0244481 | A1 * | 7/2024 | Viger | H04W 28/0278 |
| 2025/0008573 | A1 * | 1/2025 | Mandelli | H04W 74/085 |

* cited by examiner

MULTI-LINK OPERATION TRANSMIT ARCHITECTURE FOR DYNAMIC MAPPING OF TRANSMIT QUEUES TO LINKS

TECHNICAL FIELD

Aspects pertain to wireless communications. In particular, aspects relate to multi-link devices (MLDs) and multi-link operations (MLO).

BACKGROUND

New wireless standards, such as Wi-Fi 7 and 5G Rel. 16 are introducing capabilities to enable multi-link transmissions. One issue with multi-link transmissions is that stations may not have knowledge of which links will be first to be available for transmission. This can result in suboptimal performance, particularly in operations that perform queueing of packets for transmission on specific links.

DETAILED DESCRIPTION

The following description and the drawings sufficiently illustrate specific aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

New wireless standards, such as Wi-Fi 7 and 5G Rel. 16 are introducing capabilities to enable multi-link transmissions within the same MAC/PHY. For instance, 802.11be, which is defining the next generation Wi-Fi specification (Wi-Fi 7) has introduced the MLD (Multi-link Device) concept that enables multi-link transmissions within the same 802.11 MAC. 5G Rel. 16 has also defined a similar concept.

Multi-link transmissions can be characterized as permitting transmission over multiple links simultaneously. However, transmission circuitry often queues packets for transmission before transmission on a given link and knowing the link in advance can be important for these queueing operations. If the link is not known in advance, suboptimal performance (including out-of-order packet errors and latency) can result.

Systems, apparatuses and methods according to some aspects of the disclosure address these and other concerns by providing a transmitter architecture allows for queueing packets in advance without the queue having to be coupled to any particular link. The architecture allows the transmitter to dynamically map and route these queued packets to specific links at transmission start time, taking advantage of transmission over multiple links. Moreover, the transmitter architecture allows immediate routing of packets that have failed transmission on one link to be transmitted immediately on the other link. These aspects, as well as others, are described in more detail below.

Figure 1:
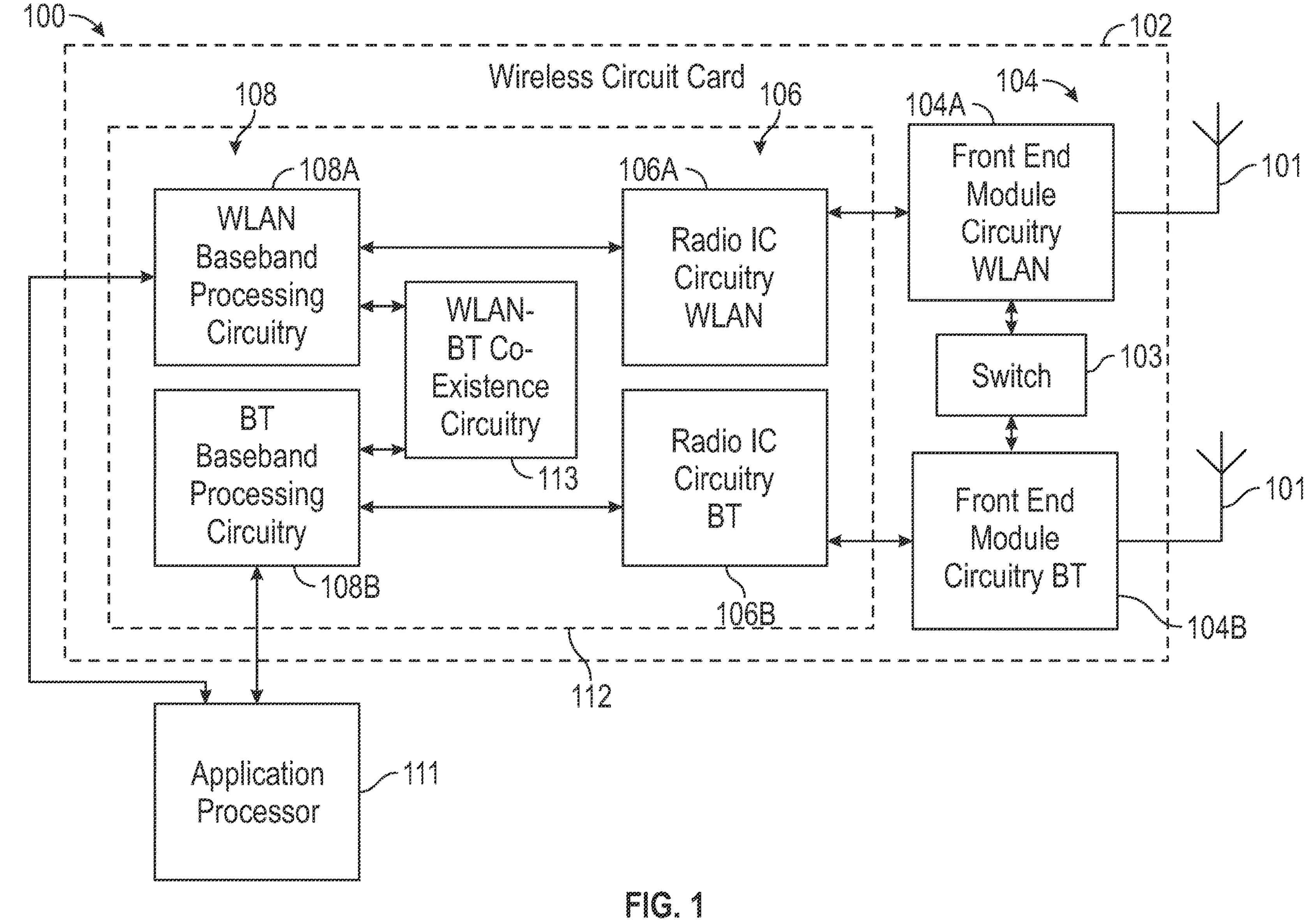
FIG. 1 is a block diagram of a radio architecture that can be used for implementation of MLO according to some aspects.

FIG. 1 is a block diagram of a radio architecture 100 that can be used for implementation of MLO according to some aspects. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although aspects are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the depiction shown in FIG. 1, although FEM 104A and FEM 104B are shown as being distinct from one another, aspects are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In FIG. 1, although radio IC circuitries 106A and 106B are shown as being distinct from one another, aspects are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband processing circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry and may further interface with application processor 111 for generation and processing of the baseband signals and for controlling operations of the radio IC circuitry 106.

Referring still to FIG. 1, as shown in this example, WLAN-BT coexistence circuitry 113 may include logic providing an interface between the WLAN baseband processing circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, aspects include within their scope the sharing of one or more antennas as between the WLAN and BT FEMs, or the provision of more than one antenna connected to each of FEM 104A or 104B.

In some aspects, the front-end module circuitry 104, the radio IC circuitry 106, and baseband processing circuitry 108 may be provided on a single radio card, such as wireless radio card 102. In some other aspects, the one or more antennas 101, the FEM circuitry 104 and the radio IC circuitry 106 may be provided on a single radio card. In some other aspects, the radio IC circuitry 106 and the baseband processing circuitry 108 may be provided on a single chip or integrated circuit (IC), such as IC 112.

In some aspects, the wireless radio card 102 may include a WLAN radio card and may be configured for Wi-Fi communications, although the scope of the aspects is not limited in this respect. In some of these aspects, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier aspects, radio architecture 100 may be part of a Wi-Fi communication station (STA) such as a wireless access point (AP), a base station or a mobile device including a Wi-Fi device. In some of these aspects, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016 IEEE 802.11ac, and/or IEEE 802.11ax standards and/or proposed specifications for WLANs, although the scope of aspects is not limited in this respect. Radio architecture 100 may also be suitable to transmit and/or receive communications in accordance with other techniques and standards.

In some aspects, the radio architecture 100 may be configured for high-efficiency (HE) Wi-Fi (HEW) communications in accordance with the IEEE 802.11ax standard. In some aspects, the radio architecture 100 may be configured for Extremely High Throughput (EHT) communications in accordance with the IEEE 802.11be standard. In these aspects, the radio architecture 100 may be configured to communicate in accordance with an OFDMA technique, although the scope of the aspects is not limited in this respect. In some aspects, the radio architecture 100 may be configured for next generation vehicle-to-everything (NGV) communications in accordance with the IEEE 802.11bd standard and one or more stations may be next generation vehicle-to-everything (NGV) stations (STAs).

In some other aspects, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the aspects is not limited in this respect.

In some aspects, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In aspects that include BT functionality as shown for example in FIG. 1, the radio architecture 100 may be configured to establish a BT synchronous connection oriented (SCO) link and/or a BT low energy (BT LE) link. In some of the aspects that include functionality, the radio architecture 100 may be configured to establish an extended SCO (eSCO) link for BT communications, although the scope of the aspects is not limited in this respect. In some of these aspects that include a BT functionality, the radio architecture may be configured to engage in a BT Asynchronous Connection-Less (ACL) communications, although the scope of the aspects is not limited in this respect. In some aspects, as shown in FIG. 1, the functions of a BT radio card and WLAN radio card may be combined on a single wireless radio card, such as single wireless radio card 102, although aspects are not so limited, and include within their scope discrete WLAN and BT radio cards In some aspects, the radio architecture 100 may include other radio cards, such as a cellular radio card configured for cellular (e.g., 3GPP such as LTE, LTE-Advanced or 5G communications).

In some IEEE 802.11 aspects, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some aspects, a 320 MHz channel bandwidth may be used. The scope of the aspects is not limited with respect to the above center frequencies, however.

Figure 2:
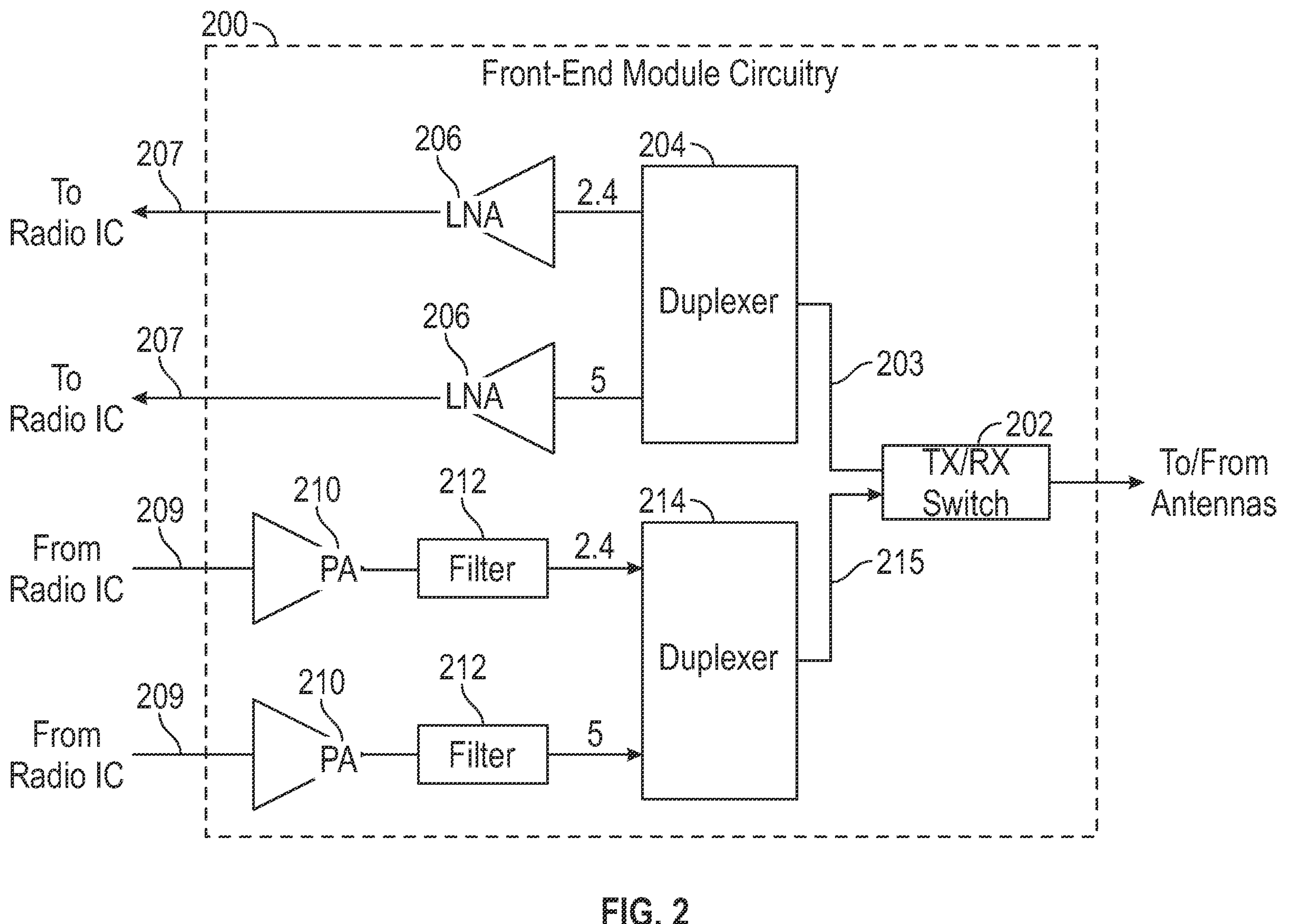
FIG. 2 illustrates a front-end module circuitry for use in the radio architecture of FIG. 1 in accordance with some aspects.

FIG. 2 illustrates FEM circuitry 200 in accordance with some aspects. The FEM circuitry 200 is one example of circuitry that may be suitable for use as the WLAN and/or BT FEM circuitry 104A/104B (FIG. 1), although other circuitry configurations may also be suitable.

In some aspects, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode aspects for Wi-Fi communication, the FEM circuitry 200 may be configured to operate in either the 2.4 GHz frequency spectrum or the 5 GHz frequency spectrum. In these aspects, the receive signal path of the FEM circuitry 200 may include a receive signal path duplexer 204 to separate the signals from each spectrum as well as provide a separate LNA 206 for each spectrum as shown. In these aspects, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some aspects, BT communications may utilize the 2.4 GHZ signal paths and may utilize the same FEM circuitry 200 as the one used for WLAN communications.

Figures 3, 4:
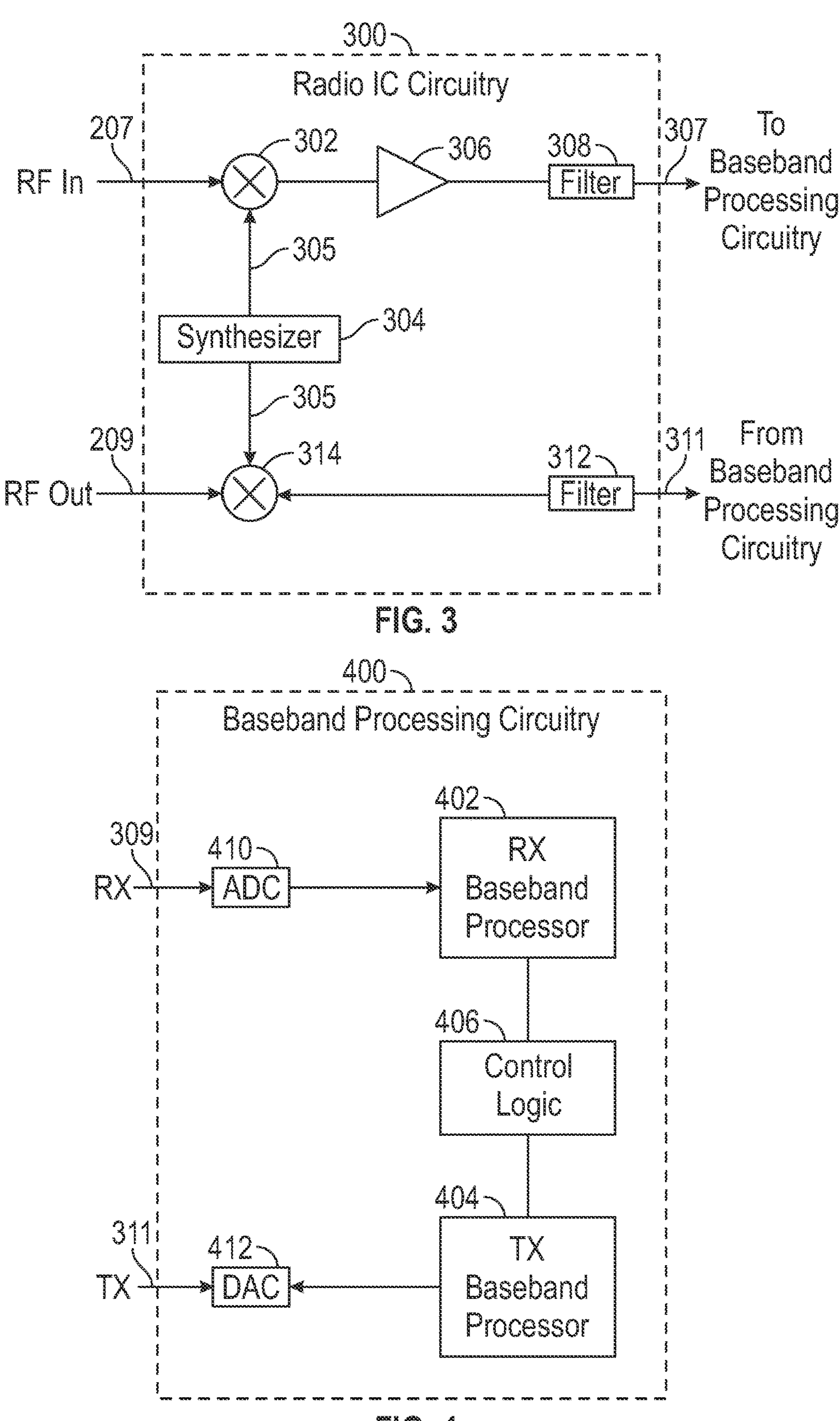
FIG. 3 illustrates a radio IC circuitry for use in the radio architecture of FIG. 1 in accordance with some aspects.
FIG. 4 illustrates a baseband processing circuitry for use in the radio architecture of FIG. 1 in accordance with some aspects.

FIG. 3 illustrates radio IC circuitry 300 in accordance with some aspects. The radio IC circuitry 300 is one example of circuitry that may be suitable for use as the WLAN or BT radio IC circuitry 106A/106B (FIG. 1), although other circuitry configurations may also be suitable.

In some aspects, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some aspects, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, aspects where each of the depicted circuitries may include more than one component. For instance, mixer circuitry 302 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some aspects, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some aspects, the output baseband signals 307 may be zero-frequency baseband signals, although this is not a requirement. In some aspects, mixer circuitry 302 may comprise passive mixers, although the scope of the aspects is not limited in this respect.

In some aspects, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of aspects is not limited in this respect.

In some aspects, the mixer circuitry 302 and the mixer circuitry 314 may each include two or more mixers and may be arranged for quadrature down-conversion and/or up-conversion respectively with the help of synthesizer circuitry 304. In some aspects, the mixer circuitry 302 and the mixer circuitry 314 may each include two or more mixers each configured for image rejection (e.g., Hartley image rejection). In some aspects, the mixer circuitry 302 and the mixer circuitry 314 may be arranged for direct down-conversion and/or direct up-conversion, respectively. In some aspects, the mixer circuitry 302 and the mixer circuitry 314 may be configured for super-heterodyne operation, although this is not a requirement.

Mixer circuitry 302 may comprise, according to one aspect: quadrature passive mixers (e.g., for the in-phase (I) and quadrature phase (Q) paths). In such an aspect, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency (fLO) from a local oscillator or a synthesizer, such as LO frequency 305 of synthesizer circuitry 304 (FIG. 3). In some aspects, the LO frequency may be the carrier frequency, while in other aspects, the LO frequency may be a fraction of the carrier frequency (e.g., one-half the carrier frequency, one-third the carrier frequency). In some aspects, the zero and ninety-degree time-varying switching signals may be generated by the synthesizer, although the scope of the aspects is not limited in this respect.

In some aspects, the LO signals may differ in duty cycle (the percentage of one period in which the LO signal is high) and/or offset (the difference between start points of the period). In some aspects, the LO signals may have a 25% duty cycle and a 50% offset. In some aspects, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the aspects is not limited in this respect. The I and Q baseband output signals may be provided to low-nose amplifier, such as amplifier circuitry 306 (FIG. 3) or to filter circuitry 308 (FIG. 3).

In some aspects, the output baseband signals 307 and the input baseband signals 311 may be analog baseband signals, although the scope of the aspects is not limited in this respect. In some alternate aspects, the output baseband signals 307 and the input baseband signals 311 may be digital baseband signals. In these alternate aspects, the radio IC circuitry may include analog-to-digital converter (ADC) and digital-to-analog converter (DAC) circuitry.

In some dual-mode aspects, a separate radio IC circuitry may be provided for processing signals for each spectrum, or for other spectrums not mentioned here, although the scope of the aspects is not limited in this respect.

In some aspects, the synthesizer circuitry 304 may be a fractional-N synthesizer or a fractional N/N+1 synthesizer, although the scope of the aspects is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some aspects, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some aspects, frequency input into synthesizer circuitry 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some aspects, a divider control input (e.g., N) may be determined from a look-up table (e.g., within a Wi-Fi card) based on a channel number and a channel center frequency as determined or indicated by the application processor 111.

In some aspects, synthesizer circuitry 304 may be configured to generate a carrier frequency as the output frequency 305, while in other aspects, the output frequency 305 may be a fraction of the carrier frequency (e.g., one-half the carrier frequency, one-third the carrier frequency). In some aspects, the output frequency 305 may be a LO frequency (fLO).

FIG. 4 illustrates a functional block diagram of baseband processing circuitry 400 in accordance with some aspects. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some aspects (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these aspects, the baseband processing circuitry 400 may also include DAC 412 to convert digital baseband signals from the TX BBP 404 to analog baseband signals.

In some aspects that communicate OFDM signals or OFDMA signals, such as through WLAN baseband processing circuitry 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some aspects, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some aspects, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) aspects, the antennas may be effectively separated to take advantage of spatial diversity and the different channel characteristics that may result. Antennas 101 may each include a set of phased-array antennas, although aspects are not so limited.

Although the radio architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some aspects, the functional elements may refer to one or more processes operating on one or more processing elements.

Figure 5:
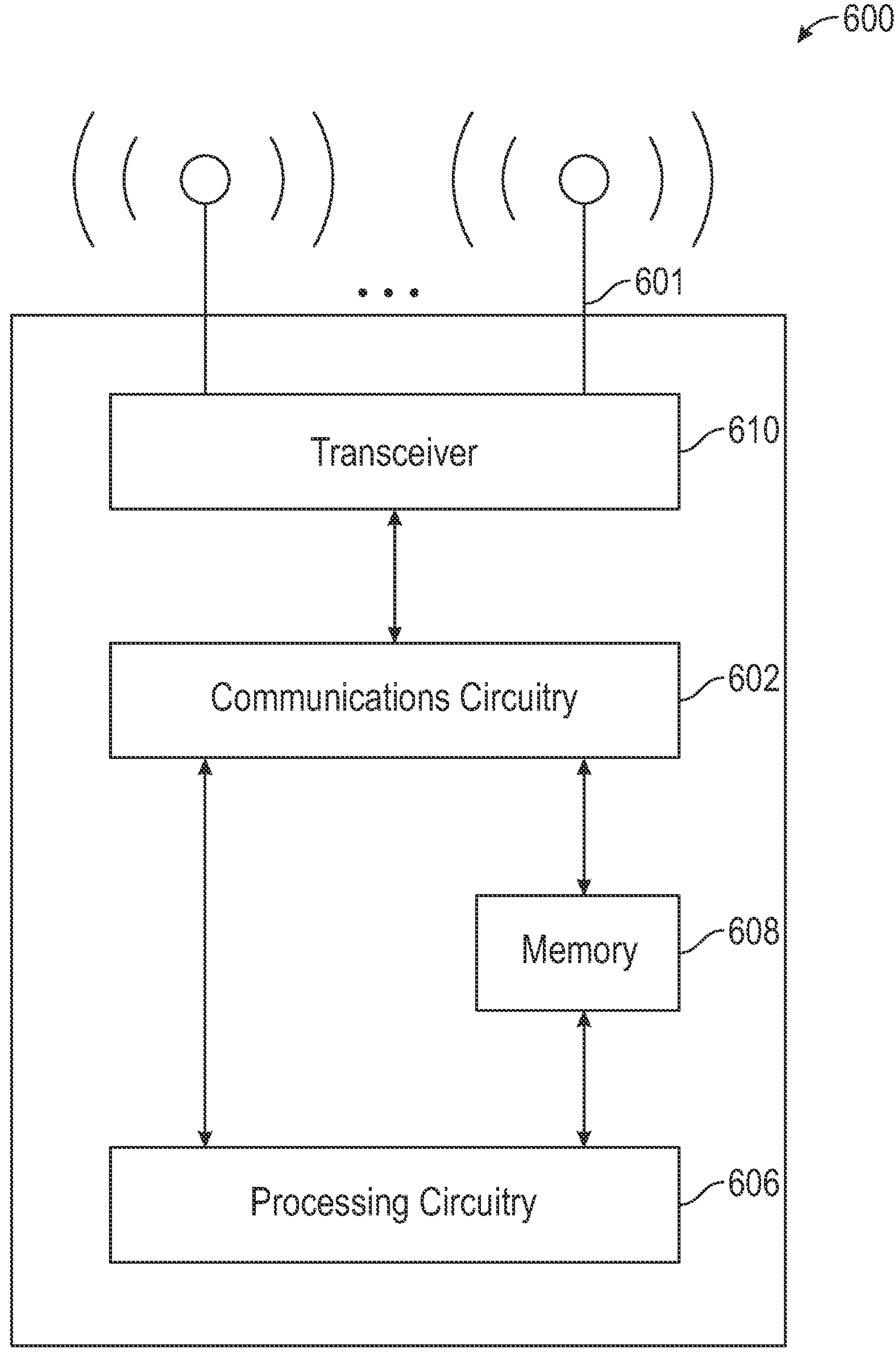
FIG. 5 is a function block diagram of a wireless communication device, in accordance with some aspects.

FIG. 5 illustrates a functional block diagram of a wireless communication device, in accordance with some embodiments. In some embodiments, FIG. 5 illustrates a functional block diagram of a communication device (STA) that may be suitable for use as an AP STA, a non-AP STA or other user device in accordance with some embodiments. The communication device 600 may also be suitable for use as a handheld device, a mobile device, a cellular telephone, a smartphone, a tablet, a netbook, a wireless terminal, a laptop computer, a wearable computer device, a femtocell, a high data rate (HDR) subscriber device, an access point, an access terminal, or other personal communication system (PCS) device.

The communication device 600 may include communications circuitry 602 and transceiver circuitry 610 for transmitting and receiving signals to and from other communication devices using one or more antennas 601. The communications circuitry 602 may include circuitry that can operate the physical layer (PHY) communications and/or medium access control (MAC) communications for controlling access to the wireless medium, and/or any other communications layers for transmitting and receiving signals. The communication device 600 may also include processing circuitry 606 and memory 608 arranged to perform the operations described herein. In some embodiments, the communications circuitry 602 and the processing circuitry 606 may be configured to perform operations detailed in the above figures, diagrams, and flows.

In accordance with some embodiments, the communications circuitry 602 may be arranged to contend for a wireless medium and configure frames or packets for communicating over the wireless medium. The communications circuitry 602 may be arranged to transmit and receive signals. The communications circuitry 602 may also include circuitry for modulation/demodulation, upconversion/downconversion, filtering, amplification, etc. In some embodiments, the processing circuitry 606 of the communication device 600 may include one or more processors. In other embodiments, two or more antennas 601 may be coupled to the communications circuitry 602 arranged for sending and receiving signals. The memory 608 may store information for configuring the processing circuitry 606 to perform operations for configuring and transmitting message frames and performing the various operations described herein. The memory 608 may include any type of memory, including non-transitory memory, for storing information in a form readable by a machine (e.g., a computer). For example, the memory 608 may include a computer-readable storage device, read-only memory (ROM), random-access memory (RAM), magnetic disk storage media, optical storage media, flash-memory devices and other storage devices and media.

In some embodiments, the communication device 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication device 600 may include one or more antennas 601. The antennas 601 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting device.

In some embodiments, the communication device 600 may include one or more of a keyboard, a display, a non-volatile memory port, multiple antennas, a graphics processor, an application processor, speakers, and other mobile device elements. The display may be an LCD screen including a touch screen.

Although the communication device 600 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication device 600 may refer to one or more processes operating on one or more processing elements.

Transmitter Architecture for MLO

Figures 6, 7:
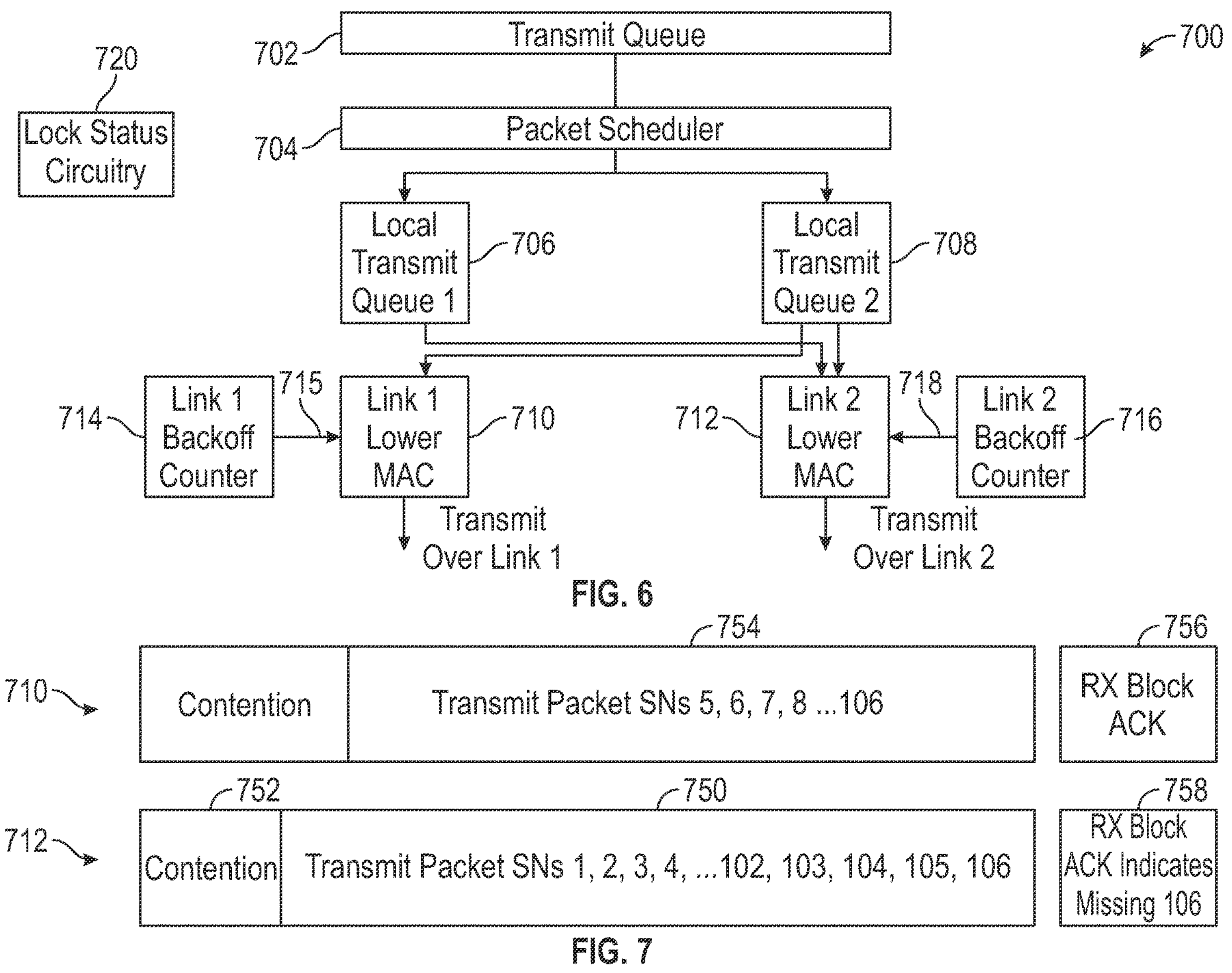
FIG. 6 illustrates a MAC transmitter architecture for implementing MLO communications in accordance with some aspects.
FIG. 7 illustrates an example of contention and simultaneous transmission on multiple links in accordance with some aspects.

FIG. 6 illustrates a MAC transmitter architecture 700 for implementing MLO communications in accordance with some aspects. In examples, the transmitter architecture can be implemented in transceiver circuitry 610 (FIG. 5) of a multi-link device (MLD), which can be similar to device 600 (FIG. 5).

As mentioned briefly earlier herein, a transmitter using an architecture similar to architecture 700 can allow for queueing of packets for transmission in advance without having the queue tightly coupled to a specific link. The architecture 700 allows the transmitter to dynamically map and route these queued packets to specific links at transmission start time, taking advantage of transmission over multiple links. Moreover, the transmitter architecture 700 allows immediate routing of packets that have failed transmission on one link to be transmitted immediately on the other link.

Queue 702 illustrates packets for transmission that can arrive from an upper layer of the device 600 or any similar device. The queue 702 can be stored in, for example DRAM or other memory, and the queue can hold packets for transmission with sequence numbers such that the packets can be transmitted in order.

The packet transmit scheduler 704 can forward a small number of packets to a first local transmit queue 706 and a second local transmit queue 708. More than two local transmit queues can be provided, and aspects are not limited to any particular number of local transmit queues. The first local transmit queue 706 and the second local transmit queue 708 can each hold the first few packets that will be transmitted and during the transmission of these packets the platform can wake from a sleep state or other lower power state to bring the rest of the packets for transmission from the host DRAM (e.g., queue 700) to the first local transmit queue 706 and the second local transmit queue 708.

The first local transmit queue 706 and the second local transmit queue 708 can be tightly coupled to first MAC circuitry 710 and second MAC circuitry 712 in an all-to-all mapping as shown in FIG. 6. This tight coupling allows transmission over the relevant link to start immediately without any delay. In some examples, this delay could be caused by the platform (e.g., MLD or other device) being in a low power state as mentioned above although aspects are not limited thereto. In some examples, packets are split between the first local transmit queue 706 and the second local transmit queue 708 based on the rate at which each of first MAC circuitry 710 and second MAC circuitry 712 are transmitting. When a local transmit queue 706 and the second local transmit queue 708 become empty the scheduler 704 can fetch next sequential packets from transmit queue 702 or an out-of-order packet can be fetched if retransmission is necessary (e.g., due to reception of a NACK).

With respect to backoff counters, in current systems supporting MLO, MLO devices are expected to implement a backoff counter to wait a random number of slots to help find an opportunity to send a data packet. This is done to comply with currently-available methods known as Carrier-Sense Multiple Access with Collision Avoidance, Enhanced Distributed Channel Access (CSMA/CA— EDCA). According to EDCA methods, a STA can draw a backoff counter value for specific Access Category (AC) and decrement this value by 1 where the STA senses the medium as not Busy. When the backoff counter value reaches zero and the medium is not Busy, the STA gets a transmission Opportunity (TXOP) during which the STA can start transmitting for a maximum defined TXOP duration. Following this transmission, the STA draws a new backoff counter for the next TXOP.

If a link is idle, then a packet is sent. This backoff counting is based on link conditions, but a currently-available MLO device may not know in advance which of the available links (of the multiple links) will be first available for transmission. Problems can also occur in uplink communications (e.g., communications from a user device to a base station or access point) in which a trigger frame is sent to instruct a device to transmit on a designated link, because the user device does not know in advance on which link to expect this trigger frame.

The architecture 700 addresses these and other concerns by providing a first backoff counter 714 and a second backoff counter 716. Respectively, the backoff counters can correspond to different links in a multi-link system. The first backoff counter 714 can transmit a command 715 to first MAC circuitry 710 to start transmission based on a backoff counter expiration or a trigger frame reception (for example, as described earlier herein). Similarly, second backoff counter 716 can transmit a command 718 to second MAC circuitry 712 to start transmission upon backoff counter expiration or trigger frame reception corresponding to a second link in a multi-link system. While two links and sets of backoff counters are described, the architecture 700 can be expanded for transmission on any number of links according to aspects.

Upon reception of command 715, the first MAC circuitry 710 can select one of the first local transmit queue 706 and a second local transmit queue 708 and bind that respective queue to link 1. The selection can be made based on which of the first local transmit queue 706 and a second local transmit queue 708 has packets with lower sequence numbers. The non-selected local transmit queue (706 or 708) is then available for simultaneous transmission over link 2 when link 2 becomes available or over link 1 when the packets from the selected queue (e.g., first local transmit queue 706 or second local transmit queue 708) are done being transmitted over link 1.

Similarly, upon reception of command 718, the second MAC circuitry 712 can select one of the first local transmit queue 706 and a second local transmit queue 708 and bind that respective queue to link 2. The selection can be made based on which of the first local transmit queue 706 and a second local transmit queue 708 has packets with lower sequence numbers. The non-selected local transmit queue (706 or 708) is then available for simultaneous transmission over link 1 when link 1 becomes available or over link 2 when the packets from the selected queue have bene transmitted. In examples, lock and status circuitry 720 can handle the binding and locking of first local transmit queue 706 and a second local transmit queue 708 to first MAC circuitry 710 and second MAC circuitry 712. The first MAC circuitry 710 and second MAC circuitry 712 will not be triggered for transmission if there is not an available local transmit queue 706, 708 to transmit from. For example, in some example aspects, one of the first MAC circuitry 710 and second MAC circuitry 712 may bind and lock both local transmit queues, in which case the other of the MAC circuitry will not perform any transmission. In still other examples, the first local transmit queue 706 and the second local transmit queue 708 may bind to one of one of the first MAC circuitry 710 and second MAC circuitry 712 for only one transmission and then may switch to the other of the first MAC circuitry 710 and second MAC circuitry 712 for subsequent transmissions.

FIG. 7 illustrates an example of contention and simultaneous transmission on multiple links in accordance with some aspects. In FIG. 7, transmission occurs on link 1 and link 2. Packets are split between a first local transmit queue 706 and a second local transmit queue 708, such that first local transmit queue 706 includes packets 1, 2, 3 and 4 and second local transmit queue 708 includes packets 5, 6, 7, and 8. While particular packet numbers are depicted, it will be appreciated that these packet numbers are merely examples for purposes of illustration of example aspects.

In the example shown in FIG. 7, second MAC circuitry 712 gets a first transmit opportunity 750 after contention period 752 and binds one of the local transmit queues (e.g., first local transmit queue 706 (FIG. 6)) to link 2 and transmits packet from the first local transmit queue 706 (e.g., starting with sequence number (SN) 1). First MAC circuitry 710 may get a second transmit opportunity 754 slightly after the second MAC circuitry 712 transmit opportunity, bind to the second local transmit queue 708, and transmit a number of packets from the second local transmit queue 708 (e.g., packets 65, 6, 7, and 8 in the illustrated example).

After the first few packets, packet numbers can be split between the first local transmit queue 706 and the second local transmit queue 708 based on the rate at which the first MAC circuitry 710 and the second MAC circuitry 712 are transmitting. The packets are then transmitted out over the first MAC circuitry 710 and the second MAC circuitry 712 accordingly from respective first local transmit queue 706 and second local transmit queue 708 based on the binding. ACKs 756, 758 are received indicating correctly received packets. In the illustrated example, packet having SN "106" fails on transmission (as indicated by the respective receive ACK 758) using the second MAC circuitry 712 and is retransmitted using the first MAC circuitry 710.

In examples, simultaneous transmission can be from a same TID (Traffic Identifier) if the corresponding device (e.g., STA) supports this, or from different TIDs. TID to link mapping negotiation is used to determine which TIDs can be transmitted on which links, as described later herein. Packets from TIDs that are mapped to more than one link can be transmitted over multiple links simultaneously.

Packet assignment to specific links is done at transmission time, to allow for retransmission of failed packets immediately or as soon as possible after failure on another link without needing to wait for an ongoing transmission to end on the other link.

Transmitter circuitry according to aspects described above can achieve higher throughput and lower latency while taking advantage of MLO capabilities. The architecture allows for the maintenance of relatively small transmit queues in network interface hardware, and allows a host processor (e.g., CPU) to enter a low-power mode while the device is waiting for a transmit opportunity over multiple links. Examples according to aspects support transmission of data from the same TID over at least two links simultaneously.

Figure 8:
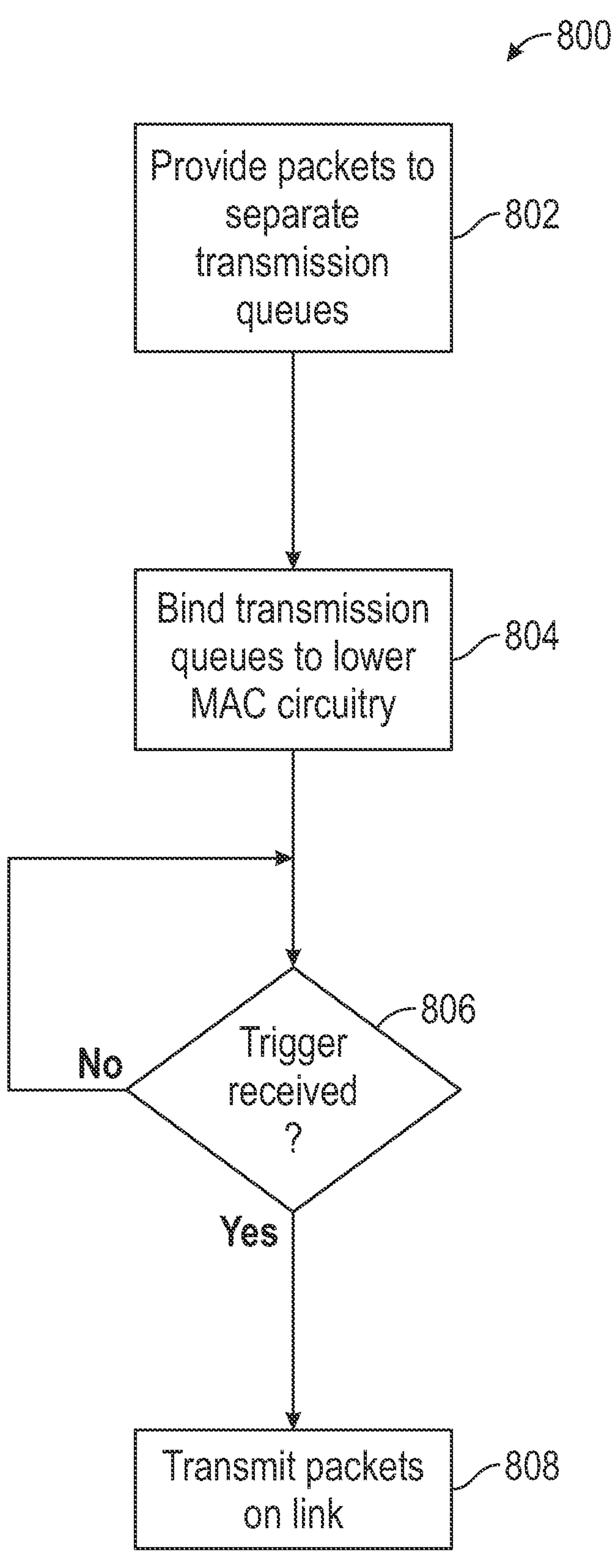
FIG. 8 is a procedure transmitting packets performed by a multi-link device (MLD), in accordance with some aspects.

FIG. 8 is a procedure 800 transmitting packets performed by a multi-link device (MLD), in accordance with some aspects. The procedure 800 can be performed by any components shown in FIGS. 1-7 and 9-10. For example, the procedure 800 can be performed by transceiver circuitry 610 (FIG. 5) including components of architecture 700 within transceiver circuitry 610.

Operation 802 comprises providing packets from at least one of at least two transmission queues 706, 708 to at least one of a first medium access control (MAC) circuitry 710 and second MAC circuitry 712.

Operation 804 comprises binding at least one of the at least two transmission queues 706, 708 to at least one of the first MAC circuitry 710 and the second MAC circuitry 712. Any of the criteria for binding described with respect to FIG. 6 can be included. For example, binding may not occur to respective MAC circuitry 710, 712 if no transmission is occurring one of the MAC circuitry 710, 712.

At block 806, if a trigger is received (e.g., from backoff counter 714 or 716) then transmission of packets can occur on the respective link at operation 808.

In some embodiments, a physical layer protocol data unit may be a physical layer conformance procedure (PLCP) protocol data unit (PPDU). In some embodiments, the AP and STAs may communicate in accordance with one of the IEEE 802.11 standards. IEEE 802.11-2016 is incorporated herein by reference. IEEE P802.11-REVmd/D2.4, August 2019, and IEEE draft specification IEEE P802.11ax/D5.0, October 2019 are incorporated herein by reference in their entireties. In some embodiments, the AP and STAs may be directional multi-gigabit (DMG) STAs or enhanced DMG (EDMG) STAs configured to communicate in accordance with IEEE 802.11ad standard or IEEE draft specification IEEE P802.11ay, February 2019, which is incorporated herein by reference.

Other Systems and Apparatuses

Figure 9:
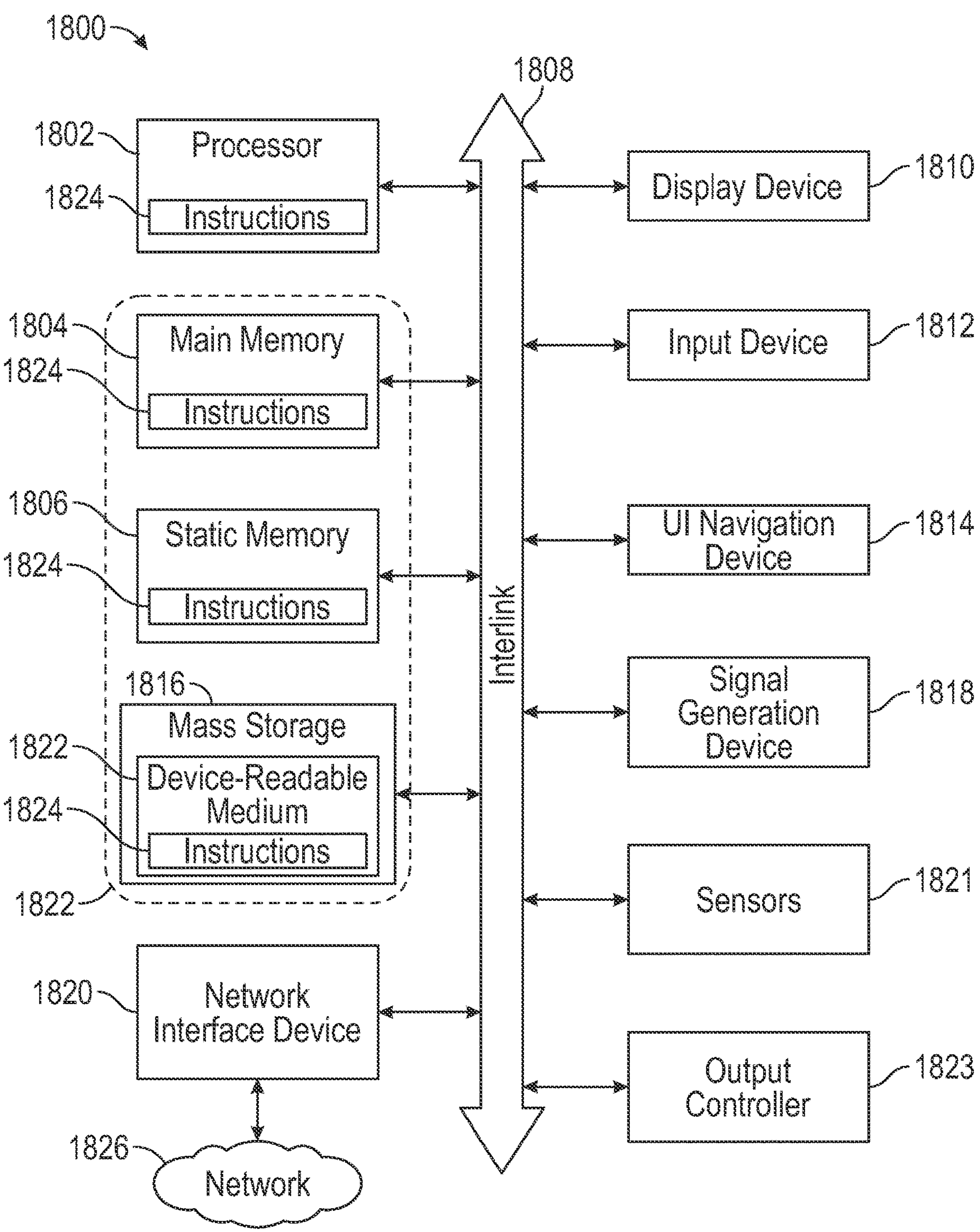
FIG. 9 illustrates a block diagram of a communication device such as an evolved Node-B (eNB), a new generation Node-B (gNB), an access point (AP), a wireless station (STA), a mobile station (MS), or a user equipment (UE), in accordance with some aspects.

FIG. 9 illustrates a block diagram of a communication device 1800 such as an evolved Node-B (eNB), a new generation Node-B (gNB), an access point (AP), a wireless station (STA), a mobile station (MS), or a user equipment (UE), in accordance with some aspects. Any of the above apparatuses can be incorporated in the communication device 1800. In alternative aspects, the communication device 1800 may operate as a standalone device or may be connected (e.g., networked) to other communication devices. In some aspects, the communication device 1800 can use one or more of the techniques and circuits discussed herein, in connection with any of FIG. 1-FIG. 8.

Circuitry (e.g., processing circuitry) is a collection of circuits implemented in tangible entities of the device 1800 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 1800 follow.

In some aspects, the device 1800 may operate as a standalone device or may be connected (e.g., networked) to other devices. In a networked deployment, the communication device 1800 may operate in the capacity of a server communication device, a client communication device, or both in server-client network environments. In an example, the communication device 1800 may act as a peer communication device in peer-to-peer (P2P) (or other distributed) network environment. The communication device 1800 may be a UE, eNB, PC, a tablet PC, a STB, a PDA, a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device (e.g., UE) 1800 may include a hardware processor 1802 (e.g., a central processing unit (CPU), a graphics processing unit (GPU), a hardware processor core, or any combination thereof), a main memory 1804, a static memory 1806, and mass storage device 1816 (e.g., hard drive, tape drive, flash storage, or other block or storage devices), some or all of which may communicate with each other via an interlink (e.g., bus) 1808.

The communication device 1800 may further include a display unit 1810, an alphanumeric input device 1812 (e.g., a keyboard), and a user interface (UI) navigation device 1814 (e.g., a mouse). In an example, the display unit 1810, input device 1812 and UI navigation device 1814 may be a touch screen display. The communication device 1800 may additionally include a signal generation device 1818 (e.g., a speaker), a network interface device 1820, and one or more sensors 1821, such as a global positioning system (GPS) sensor, compass, accelerometer, or another sensor. The communication device 1800 may include an output controller 1823, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The mass storage device 1816 may include a communication device-readable medium 1822, on which is stored one or more sets of data structures or instructions 1824 (e.g., software) embodying or utilized by any one or more of the techniques or functions described herein. In some aspects, registers of the processor 1802, the main memory 1804, the static memory 1806, and/or the mass storage device 1816 may be, or include (completely or at least partially), the device-readable medium 1822, on which is stored the one or more sets of data structures or instructions 1824, embodying or utilized by any one or more of the techniques or functions described herein. In an example, one or any combination of the hardware processor 1802, the main memory 1804, the static memory 1806, or the mass storage device 1816 may constitute the device-readable medium 1822.

As used herein, the term "device-readable medium" is interchangeable with "computer-readable medium" or "machine-readable medium." While the communication device-readable medium 1822 is illustrated as a single medium, the term "communication device-readable medium" may include a single medium or multiple media (e.g., a centralized or distributed database, and/or associated caches and servers) configured to store the one or more instructions 1824.

The term "communication device-readable medium" may include any medium that is capable of storing, encoding, or carrying instructions for execution by the communication device 1800 and that cause the communication device 1800 to perform any one or more of the techniques of the present disclosure, or that is capable of storing, encoding, or carrying data structures used by or associated with such instructions. Non-limiting communication device-readable medium examples may include solid-state memories, and optical and magnetic media. Specific examples of communication device-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 1824 may further be transmitted or received over a communications network 1826 using a transmission medium via the network interface device 1820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1820 may include one or more physical jacks (e.g., Ethernet, coaxial, or phone jacks) or one or more antennas to connect to the communications network 1826. In an example, the network interface device 1820 may include a plurality of antennas to wirelessly communicate using at least one of single-input multiple-output (SIMO), MIMO, or multiple-input single-output (MISO) techniques. In some examples, the network interface device 1820 may wirelessly communicate using Multiple User MIMO techniques.

The term "transmission medium" shall be taken to include any intangible medium that is capable of storing, encoding, or carrying instructions for execution by the communication device 1800, and includes digital or analog communications signals or other intangible medium to facilitate communication of such software. In this regard, a transmission medium in the context of this disclosure is a device-readable medium.

Figure 10:
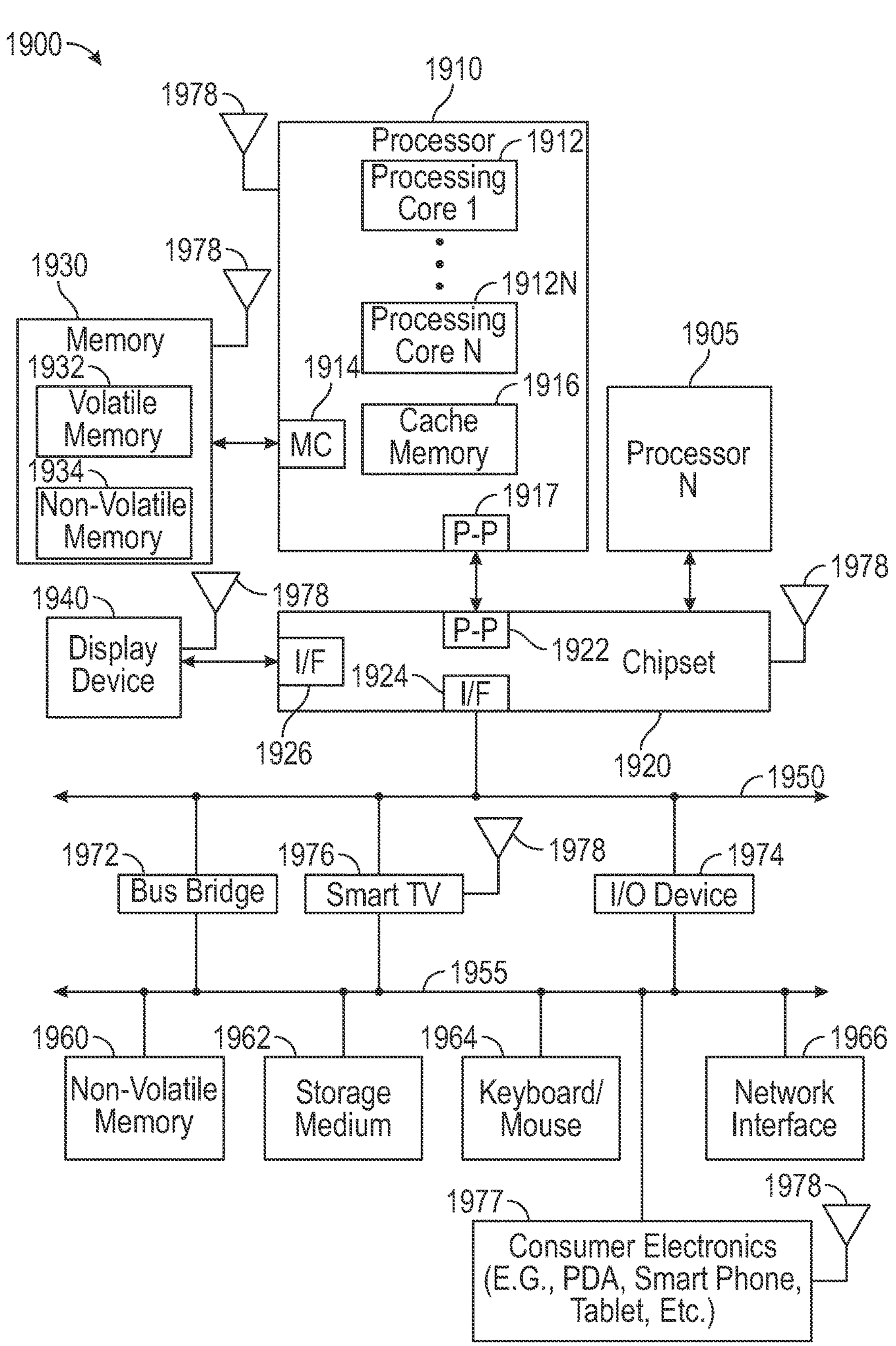
FIG. 10 illustrates a system level diagram, depicting an example of an electronic device (e.g., system) that can include, for example, a transmitter configured to selectively fan out a signal to one of multiple communication channels.

FIG. 10 illustrates a system level diagram, depicting an example of an electronic device (e.g., system) that can include, for example, a transmitter configured to selectively fan out a signal to one of multiple communication channels. FIG. 10 is included to show an example of a higher-level device application for the subject matter discussed above with regards to FIGS. 1-9. In one aspect, system 1900 includes, but is not limited to, a desktop computer, a laptop computer, a netbook, a tablet, a notebook computer, a personal digital assistant (PDA), a server, a workstation, a cellular telephone, a mobile computing device, a smart phone, an Internet appliance, or any other type of computing device. In some aspects, system 1900 is a system on a chip (SOC) system.

In one aspect, processor 1910 has one or more processor cores 1912, . . . , 1912N, where 1912N represents the Nth processor core inside processor 1910 where N is a positive integer. In one aspect, system 1900 includes multiple processors including 1910 and 1905, where processor 1905 has logic similar or identical to the logic of processor 1910. In some aspects, processing core 1912 includes, but is not limited to, pre-fetch logic to fetch instructions, decode logic to decode the instructions, execution logic to execute instructions and the like. In some aspects, processor 1910 has a cache memory 1916 to cache instructions and/or data for system 1900. Cache memory 1916 may be organized into a hierarchal structure including one or more levels of cache memory.

In some aspects, processor 1910 includes a memory controller 1914, which is operable to perform functions that enable the processor 1910 to access and communicate with memory 1930 that includes a volatile memory 1932 and/or a non-volatile memory 1934. In some aspects, processor 1910 is coupled with memory 1930 and chipset 1920. Processor 1910 may also be coupled to a wireless antenna 1978 to communicate with any device configured to transmit and/or receive wireless signals. In one aspect, an interface for wireless antenna 1978 operates in accordance with, but is not limited to, the IEEE 802.11 standard and its related family, Home Plug AV (HPAV), Ultra Wide Band (UWB), Bluetooth, WiMax, or any form of wireless communication protocol.

In some aspects, volatile memory 1932 includes, but is not limited to, Synchronous Dynamic Random Access Memory (SDRAM), Dynamic Random Access Memory (DRAM), RAIVIBUS Dynamic Random Access Memory (RDRAM), and/or any other type of random access memory device. Non-volatile memory 1934 includes, but is not limited to, flash memory, phase change memory (PCM), read-only memory (ROM), electrically erasable programmable read-only memory (EEPROM), or any other type of non-volatile memory device.

Memory 1930 stores information and instructions to be executed by processor 1910. In one aspect, memory 1930 may also store temporary variables or other intermediate information while processor 1910 is executing instructions. In the illustrated aspect, chipset 1920 connects with processor 1910 via Point-to-Point (PtP or P-P) interfaces 1917 and 1922. Chipset 1920 enables processor 1910 to connect to other elements in system 1900. In some aspects of the example system, interfaces 1917 and 1922 operate in accordance with a PtP communication protocol such as the Intel® QuickPath Interconnect (QPI) or the like. In other aspects, a different interconnect may be used.

In some aspects, chipset 1920 is operable to communicate with processor 1910, 1905, display device 1940, and other devices, including a bus bridge 1972, a smart TV 1976, I/O devices 1974, nonvolatile memory 1960, a storage medium (such as one or more mass storage devices) 1962, a keyboard/mouse 1964, a network interface 1966, and various forms of consumer electronics 1977 (such as a PDA, smart phone, tablet etc.), etc. In one aspect, chipset 1920 couples with these devices through an interface 1924. Chipset 1920 may also be coupled to a wireless antenna 1978 to communicate with any device configured to transmit and/or receive wireless signals.

Chipset 1920 connects to display device 1940 via interface 1926. Display 1940 may be, for example, a liquid crystal display (LCD), a plasma display, cathode ray tube (CRT) display, or any other form of visual display device. In some aspects of the example system, processor 1910 and chipset 1920 are merged into a single SOC. In addition, chipset 1920 connects to one or more buses 1950 and 1955 that interconnect various system elements, such as I/O devices 1974, nonvolatile memory 1960, storage medium 1962, a keyboard/mouse 1964, and network interface 1966. Buses 1950 and 1955 may be interconnected together via a bus bridge 1972.

In one aspect, mass storage device 1962 includes, but is not limited to, a solid-state drive, a hard disk drive, a universal serial bus flash memory drive, or any other form of computer data storage medium. In one aspect, network interface 1966 is implemented by any type of well-known network interface standard including, but not limited to, an Ethernet interface, a universal serial bus (USB) interface, a Peripheral Component Interconnect (PCI) Express interface, a wireless interface and/or any other suitable type of interface. In one aspect, the wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 10 are depicted as separate blocks within the system 1900, the functions performed by some of these blocks may be integrated within a single semiconductor circuit or may be implemented using two or more separate integrated circuits. For example, although cache memory 1916 is depicted as a separate block within processor 1910, cache memory 1916 (or selected aspects of 1916) can be incorporated into processor core 1912.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "an example aspect," "some aspects," "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to and are not intended to imply that the objects so described must be in a given sequence, either temporally, spatially, in ranking, or in any other manner.

The term "wireless device", as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that is integrated with a computer, or a peripheral that is attached to a computer. In some demonstrative aspects, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting and/or the action of receiving. In one example, the phrase "communicating a signal" may refer to the action of transmitting the signal by a first device and may not necessarily include the action of receiving the signal by a second device. In another example, the phrase "communicating a signal" may refer to the action of receiving the signal by a first device and may not necessarily include the action of transmitting the signal by a second device.

Some demonstrative aspects may be used in conjunction with a wireless communication network communicating over a frequency band above 45 Gigahertz (GHz), e.g., 60 GHz. However, other aspects may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a frequency band above 45 GHz, a frequency band below 20 GHz, e.g., a Sub 1 GHz (S1G) band, a 2.4 GHz band, a 5 GHz band, a WLAN frequency band, a WPAN frequency band, a frequency band according to the WGA specification, and the like.

As used herein, the term "circuitry" may, for example, refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, circuitry may include logic, at least partially operable in hardware. In some aspects, the circuitry may be implemented as part of and/or in the form of a radio virtual machine (RVM), for example, as part of a Radio processor (RP) configured to execute code to configured one or more operations and/or functionalities of one or more radio components.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna" or "antenna array," as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

Additional Notes and Aspects

Example 1 of a multi-link device (MLD), the apparatus comprising: at least two transmission queues; and first medium access control (MAC) circuitry and second MAC circuitry configured to transmit data of the at least two transmission queues over respective links responsive to receiving a trigger indicating that a transmission opportunity (TXOP) is available on the link corresponding to the respective first MAC circuitry and second MAC circuitry.

In Example 2, the subject matter of Example 1 can optionally include binding circuitry configured to bind at least one of the at least two transmission queues to at least one of the first MAC circuitry and the second MAC circuitry.

In Example 3, the subject matter of Example 2 can optionally include wherein the binding circuitry is configured to bind both of the at least two transmission queues to one of the first MAC circuitry and the second MAC circuitry responsive to an indication that no TXOP is available for the other of the first MAC circuitry and the second MAC circuitry.

In Example 4, the subject matter of Example 2 can optionally include wherein the binding circuitry is configured to bind at least one of the at least two transmission queues to one of the first MAC circuitry and the second MAC circuitry for only one TXOP.

In Example 5, the subject matter of any of Examples 1~4 can optionally include scheduler circuitry configured to provide packets of an upper layer of the apparatus to each of the at least two transmission queues.

In Example 6, the subject matter of Example 5 can optionally include wherein the scheduler circuitry is configured to provide packets to each of the at least two transmission queues based on a rate of transmission of the first MAC circuitry and the second MAC circuitry.

In Example 7, the subject matter of Example 6 can optionally include wherein one of the first MAC circuitry and the second MAC circuitry is configured to retransmit packets that failed to be transmitted by the other of the first MAC circuitry and the second MAC circuitry.

In Example 8, the subject matter of Example 7 can optionally include wherein the scheduler circuitry provides the packets that failed to be transmitted for retransmission during a same TXOP as the failed transmission.

In Example 9, the subject matter of any of Examples 1-8 can optionally include wherein the first MAC circuitry and the second MAC circuitry transmit simultaneously over separate links of a plurality of links.

In Example 10, the subject matter of any of Examples 1-9 can optionally include wherein the triggers are provided by backoff counter circuitry provided for each separate link and coupled directly to each of the respective first MAC circuitry and second MAC circuitry.

Example 11 is a computer-readable storage medium that stores instructions for execution by processing circuitry of a multi-link device (MLD), the instructions to cause the MLD to perform operations including: providing packets from at least one of at least two transmission queues to at least one of a first medium access control (MAC) circuitry and second MAC circuitry; receiving a trigger indicating a transmission opportunity on a link corresponding to one of the first MAC circuitry and the second MAC circuitry; and transmitting data of the at least two transmission queues over respective links responsive to receiving a trigger indicating that a transmission opportunity (TXOP) is available on the link corresponding to the respective first MAC circuitry and second MAC circuitry.

In Example 12, the subject matter of Example 11 can optionally include binding at least one of the at least two transmission queues to at least one of the first MAC circuitry and the second MAC circuitry.

In Example 13, the subject matter of Example 12 can optionally include wherein the binding comprising binding both of the at least two transmission queues to one of the first MAC circuitry and the second MAC circuitry responsive to an indication that no TXOP is available for the other of the first MAC circuitry and the second MAC circuitry.

In Example 14, the subject matter of Example 12 can optionally include wherein the binding comprises binding at least one of the at least two transmission queues to one of the first MAC circuitry and the second MAC circuitry for only one TXOP.

In Example 15, the subject matter of any of Examples 11-14 can optionally include wherein the operations further comprise providing packets of an upper layer of the MLD to each of the at least two transmission queues based on a rate of transmission of the first MAC circuitry and the second MAC circuitry.

In Example 16, the subject matter of Example 15 can optionally include wherein the operations further comprise retransmitting packets that failed to be transmitted by the other of the first MAC circuitry and the second MAC circuitry.

In Example 17, the subject matter of Example 16 can optionally include wherein the operations further comprise providing the packets that failed to be transmitted for retransmission during a same TXOP as the failed transmission.

Example 18 is a method for controlling transmission in a multi-link device (MLD), the method comprising: providing packets from at least one of at least two transmission queues to at least one of a first medium access control (MAC) circuitry and second MAC circuitry; receiving a trigger indicating a transmission opportunity on a link corresponding to one of the first MAC circuitry and the second MAC circuitry; and transmitting data of the at least two transmission queues over respective links responsive to receiving a trigger indicating that a transmission opportunity (TXOP) is available on the link corresponding to the respective first MAC circuitry and second MAC circuitry.

In Example 19, the subject matter of Example 18 can optionally include binding at least one of the at least two transmission queues to at least one of the first MAC circuitry and the second MAC circuitry.

In Example 20, the subject matter of Example 19 can optionally include wherein the binding comprising binding both of the at least two transmission queues to one of the first MAC circuitry and the second MAC circuitry responsive to an indication that no TXOP is available for the other of the first MAC circuitry and the second MAC circuitry.

In Example 21, the subject matter of any of Examples 18-20 can optionally include transmitting simultaneously over a plurality of links.

In Example 22, the subject matter of any of Examples 18-21 can optionally include providing an indication for queue selection to indicate identity of one of the at least two transmission queues that holds a packet having a lowest sequence number (SN).

The above detailed description includes references to the accompanying drawings, which form a part of the detailed description. The drawings show, by way of illustration, specific aspects in which the invention can be practiced. These aspects are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other aspects can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed aspect. Thus, the following claims are hereby incorporated into the Detailed Description, with each claim standing on its own as a separate aspect, and it is contemplated that such aspects can be combined with each other in various combinations or permutations. The scope of the invention should be determined with reference to the appended claims, along with the full scope of equivalents to which such claims are legally entitled.

What is claimed is:

1. An apparatus of a multi-link device (MLD), the apparatus comprising:

a memory configured to store a host transmit queue in dynamic random access memory (DRAM);

at least two transmission queues to store a first subset of packets transferred from the host transmit queue; and first medium access control (MAC) circuitry and second MAC circuitry configured to transmit data of the at least two transmission queues over respective links responsive to receiving a trigger indicating that a transmission opportunity (TXOP) is available on the link corresponding to the respective first MAC circuitry and second MAC circuitry, the apparatus being configured to wake from a sleep state during transmission of the first subset of packets to transfer additional packets from the host transmit queue in the DRAM to the at least two transmission queues.

2. The apparatus of claim 1, further comprising:

binding circuitry configured to bind at least one of the at least two transmission queues to at least one of the first MAC circuitry and the second MAC circuitry.

3. The apparatus of claim 2, wherein the binding circuitry is configured to bind both of the at least two transmission queues to one of the first MAC circuitry and the second MAC circuitry responsive to an indication that no TXOP is available for the other of the first MAC circuitry and the second MAC circuitry.

4. The apparatus of claim 2, wherein the binding circuitry is configured to bind at least one of the at least two transmission queues to one of the first MAC circuitry and the second MAC circuitry for only one TXOP.

5. The apparatus of claim 1, further comprising scheduler circuitry configured to provide packets of an upper layer of the apparatus to each of the at least two transmission queues.

6. The apparatus of claim 5, wherein the scheduler circuitry is configured to provide packets to each of the at least two transmission queues based on a rate of transmission of the first MAC circuitry and the second MAC circuitry.

7. The apparatus of claim 6, wherein one of the first MAC circuitry and the second MAC circuitry is configured to retransmit packets that failed to be transmitted during a failed transmission by the other of the first MAC circuitry and the second MAC circuitry.

8. The apparatus of claim 7, wherein the scheduler circuitry provides the packets that failed to be transmitted for retransmission during a same TXOP as the failed transmission.

9. The apparatus of claim 1, wherein the first MAC circuitry and the second MAC circuitry transmit simultaneously over separate links of a plurality of links.

10. The apparatus of claim 1, wherein the triggers are provided by backoff counter circuitry provided for each separate link and coupled directly to each of the respective first MAC circuitry and second MAC circuitry.

11. A non-transitory computer-readable storage medium that stores instructions for execution by processing circuitry of a multi-link device (MLD), the instructions to cause the MLD to perform operations including:

storing, in dynamic random access memory (DRAM), a host transmit queue including packets for transmission;

providing packets from at least one of at least two transmission queues, the at least two transmission queues to store a first subset of packets transferred from the host transmit queue in the DRAM, to at least one of a first medium access control (MAC) circuitry and second MAC circuitry;

receiving a trigger indicating a transmission opportunity on a link corresponding to one of the first MAC circuitry and the second MAC circuitry; and transmitting data of the at least two transmission queues over respective links responsive to receiving a trigger indicating that a transmission opportunity (TXOP) is available on the link corresponding to the respective first MAC circuitry and second MAC circuitry, the MLD is to wake from a sleep state during transmission of the first subset of packets to transfer additional packets from the host transmit queue in the DRAM to the at least two transmission queues.

12. The non-transitory computer-readable storage medium of claim 11, wherein the operations further comprise:

binding at least one of the at least two transmission queues to at least one of the first MAC circuitry and the second MAC circuitry.

13. The non-transitory computer-readable storage medium of claim 12, wherein the binding comprising binding both of the at least two transmission queues to one of the first MAC circuitry and the second MAC circuitry responsive to an indication that no TXOP is available for the other of the first MAC circuitry and the second MAC circuitry.

14. The non-transitory computer-readable storage medium of claim 12, wherein the binding comprises binding at least one of the at least two transmission queues to one of the first MAC circuitry and the second MAC circuitry for only one TXOP.

15. The non-transitory computer-readable storage medium of claim 11, wherein the operations further comprise providing packets of an upper layer of the MLD to each of the at least two transmission queues based on a rate of transmission of the first MAC circuitry and the second MAC circuitry.

16. The non-transitory computer-readable storage medium of claim 15, wherein the operations further comprise retransmitting packets that failed to be transmitted during a failed transmission by the other of the first MAC circuitry and the second MAC circuitry.

17. The non-transitory computer-readable storage medium of claim 16, wherein the operations further comprise providing the packets that failed to be transmitted for retransmission during a same TXOP as the failed transmission.

18. A method for controlling transmission in a multi-link device (MLD), the method comprising:

storing, in dynamic random access memory (DRAM), a host transmit queue including packets for transmission;

providing packets from at least one of at least two transmission queues, the at least two transmission queues to store a first subset of packets transferred from the host transmit queue in the DRAM, to at least one of a first medium access control (MAC) circuitry and second MAC circuitry;

receiving a trigger indicating a transmission opportunity on a link corresponding to one of the first MAC circuitry and the second MAC circuitry; and transmitting data of the at least two transmission queues over respective links responsive to receiving a trigger indicating that a transmission opportunity (TXOP) is available on the link corresponding to the respective first MAC circuitry and second MAC circuitry, the MLD is to wake from a sleep state during transmission of the first subset of packets to transfer additional packets from the host transmit queue in the DRAM to the at least two transmission queues.

19. The method of claim 18, further comprising:

binding at least one of the at least two transmission queues to at least one of the first MAC circuitry and the second MAC circuitry.

20. The method of claim 19, wherein the binding comprising binding both of the at least two transmission queues to one of the first MAC circuitry and the second MAC circuitry responsive to an indication that no TXOP is available for the other of the first MAC circuitry and the second MAC circuitry.

21. The method of claim 18, further comprising transmitting simultaneously over a plurality of links.

22. The method of claim 18, further comprising providing an indication for queue selection to indicate identity of one of the at least two transmission queues that holds a packet having a lowest sequence number (SN).

* * * * *